(12) United States Patent
Guptill et al.

(10) Patent No.: US 6,623,363 B2
(45) Date of Patent: Sep. 23, 2003

(54) UNIVERSAL JOINT YOKE AND METHOD OF MAKING SAME

(75) Inventors: Spencer H. Guptill, New Milford, CT (US); Terrence J. Fogarty, Torrington, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/965,508

(22) Filed: Sep. 27, 2001

(65) Prior Publication Data

US 2003/0060292 A1 Mar. 27, 2003

(51) Int. Cl.$^7$ ................................................. F16D 3/16
(52) U.S. Cl. ..................... 464/118; 464/905; 29/DIG. 3
(58) Field of Search ............................... 464/117, 118, 464/905, 112, 113, 114; 29/558, 557, DIG. 3

(56) References Cited

U.S. PATENT DOCUMENTS

| | | |
|---|---|---|
| 1,985,531 A | 12/1934 | Swenson |
| 3,764,647 A | 10/1973 | McDow |
| 3,800,383 A | 4/1974 | Khambatta et al. |
| 3,835,667 A | 9/1974 | King et al. |
| 4,094,183 A | 6/1978 | Mettler |
| 4,207,757 A | 6/1980 | Onuma |
| 4,307,833 A | 12/1981 | Barnard |
| 4,508,522 A | 4/1985 | Numazawa et al. |
| 5,525,110 A | 6/1996 | Riccitelli et al. |
| 5,601,377 A | 2/1997 | Ohya |
| 5,688,065 A | 11/1997 | Mayhew |
| 5,820,467 A | * 10/1998 | Fevre et al. ................ 464/118 |
| 5,823,881 A | 10/1998 | Cornay |
| 5,845,394 A | 12/1998 | Abe et al. |
| 6,024,645 A | 2/2000 | Tomaru et al. |
| 6,049,964 A | 4/2000 | Watanabe et al. |
| 6,139,435 A | 10/2000 | Cornay |

FOREIGN PATENT DOCUMENTS

JP          56009137          1/1981

* cited by examiner

Primary Examiner—Lynne H. Browne
Assistant Examiner—Kenn Thompson
(74) Attorney, Agent, or Firm—Michael Best & Friedrich LLP

(57) ABSTRACT

A metal sheet is cut to provide an elongated blank having five regions defined along the length of the elongated blank, the defined regions being a central region, two end regions, and an intermediate region between the central region and each of the two end regions. The elongated blank is bent such that the two end regions overlap and provide a mounting for a shaft and such that a pivot member to be mounted on the central region of the elongated blank will be in alignment, axially, with respect to the shaft. Bores may be formed in the intermediate regions for mounting of a cross-piece to pivotably connect the yoke to a coupling member.

11 Claims, 2 Drawing Sheets

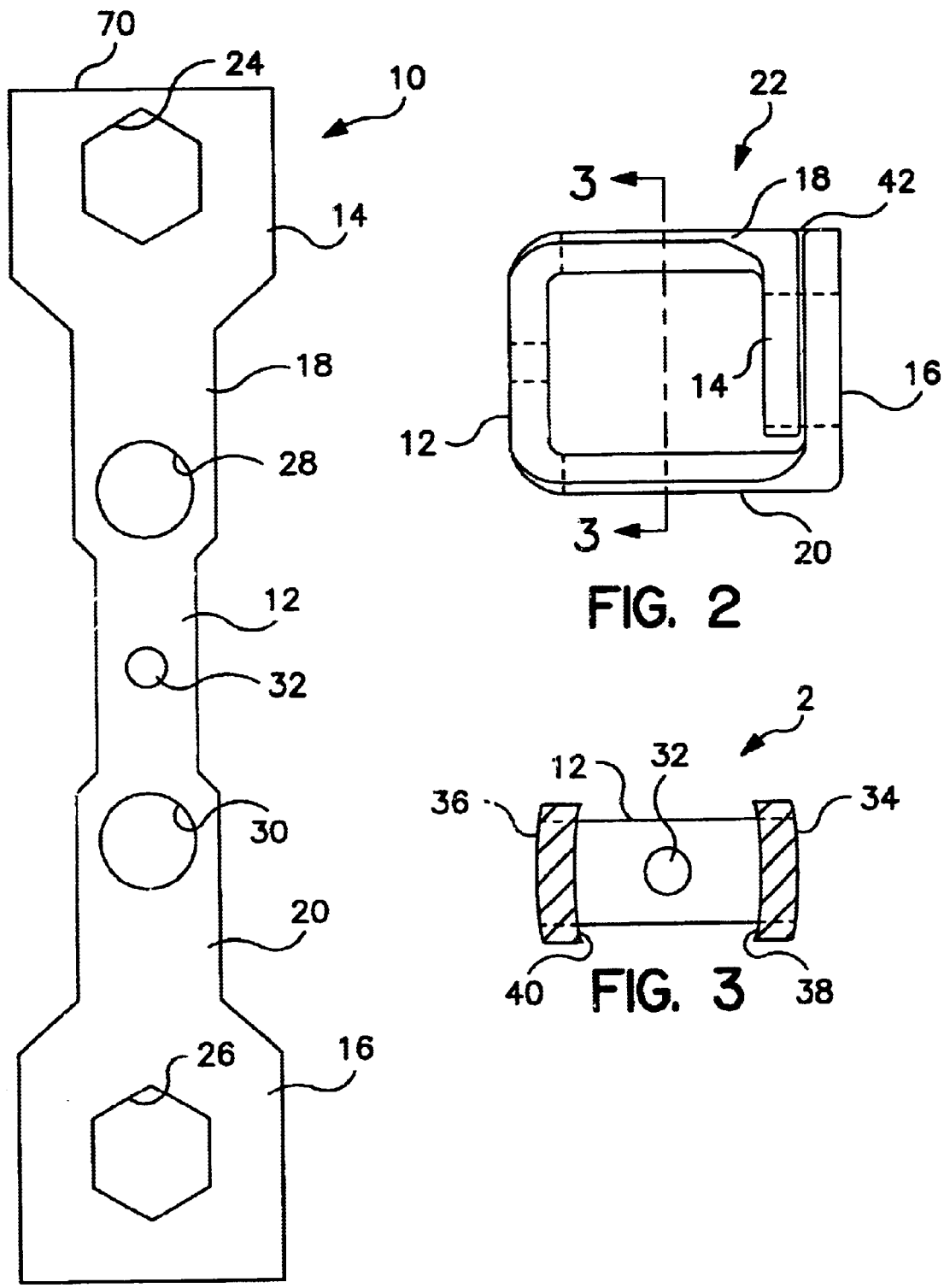

UNIVERSAL JOINT YOKE AND METHOD OF MAKING SAME

BACKGROUND OF THE INVENTION

This invention relates generally to universal joints and, more particularly, to yoke configurations for use with universal joints of the double Cardan type.

Intermediate shafts used in automobile steering columns require one or more universal joints to maneuver the column around various mechanical components. Operating angles of such universal joints have increased as vehicle engine compartments have become smaller and as rack and pinion steering systems have replaced recirculating ball steering systems. To accommodate the increased operating angles, simple universal joints with a single pivotable cross-pieces joining two shafts have been replaced by double Cardan universal joints that have two pivotable cross-pieces and a mechanism to ensure that the operating angle is distributed equally between the two pivotable cross-pieces.

Such double Cardan universal joints have two opposite end yokes, with a hub for joining each yoke to a shaft and branched arms defining a fork opposite the hub. Two pivotable cross-pieces are mounted in the branched arms of the yokes and link the yokes to a coupling yoke that transmits torque between the two shafts. A central ball joint, comprising a spherical ball fixed on one yoke and a sleeve for receiving the spherical ball fixed to the other yoke, controls the angle of the connecting yoke with respect to each shaft. Such universal joints are well known in the art. An example of a double Cardan universal joint of this type is illustrated in U.S. Pat. No. 5,820,467.

Although such designs have been effective, the high cost of forming the yokes and other components of such double Cardan universal joints has limited their use. Typically, such yokes require a casting, forging or assembly of a multipiece blank, along with machining and other manufacturing processes that add significantly to the cost of the universal joint. Accordingly, there is a need for an improved design that is suitable for manufacturing yokes for such double Cardan universal joints more simply, but without comprising the quality of the resulting universal joint.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a method of making a yoke for a double Cardan universal joint. The method comprises cutting a metal sheet to provide an elongated blank having five regions defined along the length of the elongated blank, the defined regions being a central region, two end regions, and an intermediate region between the central region and each of the two end regions. The elongated blank is bent such that the two end regions overlap and provide a mounting for a shaft and such that a pivot member to be mounted on the central region of the elongated blank will be in alignment, axially, with respect to the shaft.

In another aspect of the invention, this is accomplished by providing yoke for a double Cardan universal joint, the yoke being made according to a particular method.

The foregoing and other aspects will become apparent from the following detailed description of the invention when considered in conjunction with the accompanying drawing figures.

BRIEF DESCRIPTION OF THE DRAWING FIGURES

FIG. 1 is a plan view of an elongated blank comprising an intermediate product during the making of a yoke for a double Cardan universal joint according to an embodiment of the present invention;

FIG. 2 is a lateral view of a yoke for a double Cardan universal joint made by applying additional manufacturing steps to the elongated blank of FIG. 1;

FIG. 3 is a cross sectional view of a variation of the yoke for a double Cardan universal joint illustrated in FIG. 2, corresponding to the line 3—3 of FIG. 2.

DETAILED DESCRIPTION

Figure 4:
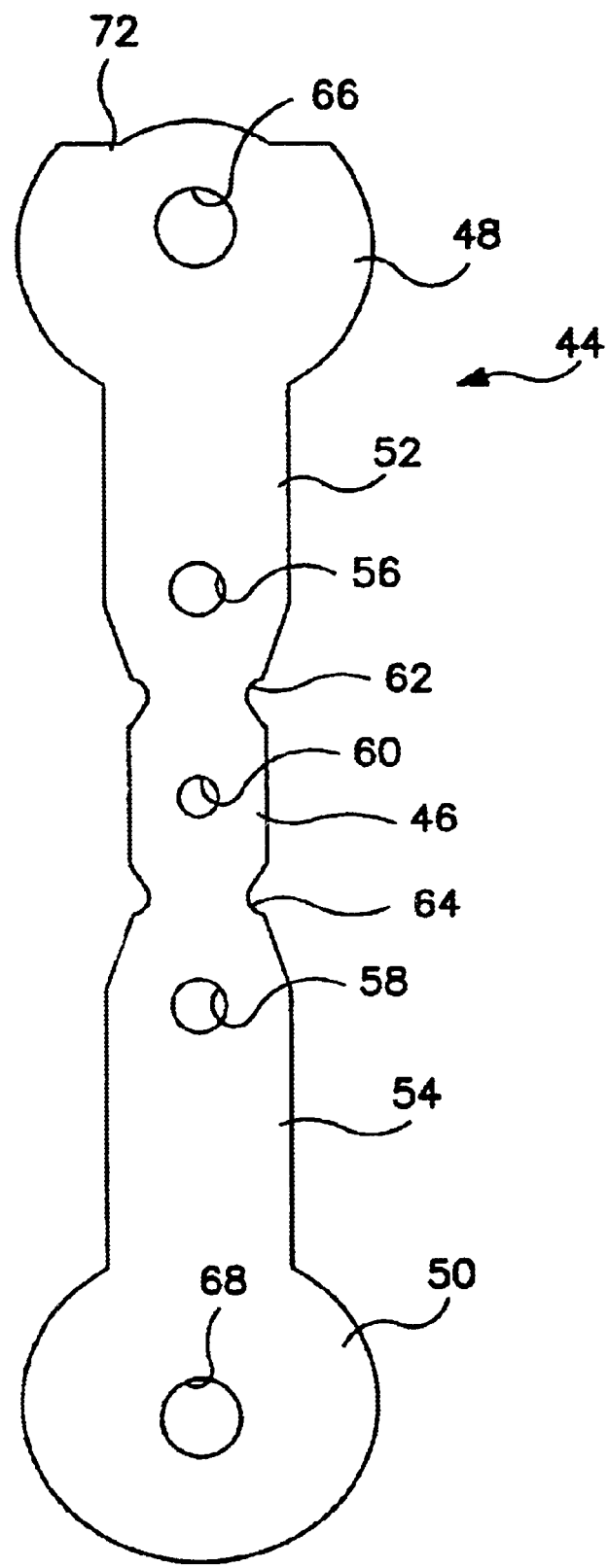
FIG. 4 is a plan view of an elongated blank comprising an intermediate product during the making of a yoke for a double Cardan universal joint according to another embodiment of the present invention.

Referring now to FIG. 1, an elongated blank 10, illustrating the present invention, comprises five regions defined along the length of the elongated blank 10, the defined regions being a central region 12, two end regions 14 and 16, and two intermediate regions 18 and 20, each intermediate region 18 or 20 being between the central region 12 and one of the two end regions 14 and 16, respectively. For convenience, the elongated blank 10 can be cut from a metal sheet of uniform thickness. The material may be mild steel, for example, or other suitable material.

The elongated blank 10 is bent such that the two end regions 14 and 16 overlap and provide a mounting for a shaft, not shown. The resulting shape facilitates the mounting of a pivot member, not shown, such that the pivot member is in alignment with an axis corresponding to the shaft. One possible bent form 22 for the elongated blank 10 is illustrated in FIG. 2. To form bent form 22, the elongated blank 10 has been bent, predominately, at predetermined locations, approximately at the junctures between the five regions, such that the bent form has a substantially rectangular longitudinal section, with central region 12 being parallel to and opposite the two overlapping end regions 14 and 16, and with the two intermediate regions being parallel and opposite each other.

To facilitate mounting of the shaft on the overlapping end regions 14 and 16, the end regions 14 and 16 may have non-circular bores 24 and 26, formed before, during or after the elongated blank 10 is cut from metal sheet, thereby providing a keyed mounting for the shaft. In the embodiment of FIGS. 1–3, the non-circular bores 24 and 26 are hexagonal, however other shapes, for example internal splines, may be used. The shaft may be solid or hollow, may have a circular or non-circular cross section, and may be fixed by interference fit, welding, staking, orbital riveting, or other known fixing method.

The intermediate regions 18 and 20 may have bores 28 and 30 formed before, during or after the elongated blank 10 is cut from the metal sheet, to facilitate mounting of a universal joint cross-piece. The bores 28 and 30 are aligned on a diameter with respect to the axis of the shaft to ensure that the cross-piece pivots to provide proper mounting of a coupling member also pivoted on the cross-piece, but at a right angle with respect to the diameter of the bores 28 and 30. Alternatively, bores 26 and 28 may be formed after the elongated blank 10 is bent to form bent blank 22.

The central region 12 may have a bore 32 for facilitating the mounting of a pivot member in alignment with the shaft. Typically, the pivot member is a spherical ball or a tubular socket. For example, a complete double Cardan universal joint may comprise two yokes made from two bent blanks 22, one bent blank 22 being equipped with a spherical ball and the other bent blank 22 being equipped with a tubular socket to receive the spherical ball of the other bent blank 22. The pivoting of the spherical ball in the tubular socket controls the angle of the coupling member that is mounted by means of a cross-piece in each bent blank 22.

FIG. 3 illustrates a variation of the bent shape of the intermediate regions 18 and 20 of the elongated blank 10. Specifically, arm portions 34 and 36 have concave surfaces 38 and 40 facing radially inwardly, such that the intermediate regions approximate longitudinal portions of a cylinder. This configuration is not required for the practice of the invention; however, it may facilitate the insertion of the universal joint cross-pieces into the bores 28 and 30 and may strengthen the intermediate regions by resisting flexing.

In the embodiment of FIGS. 1–3, the five regions have a width, defined crosswise with respect to the length of the elongated blank, and the width of the central region 12 is less than the width of the two end regions 14 and 16. Also, the width of the intermediate regions 18 and 20 is greater than the width of the central region 12 and greater than the width of the end regions 14 and 16. This configuration facilitates the mounting of the cross-pieces and the insertion of the resulting yokes into the coupling piece joining the two yokes. However, other configurations may be employed with the present invention.

The overlapping end regions 14 and 16, with the shaft being mounted on bores 24 and 26 that penetrate both layers of material, may provide a redundancy that improves the strength and reliability of the resulting yoke. Generally, no fixing together of the end regions 14 and 16 is believed to be necessary. However, if desired, the end regions 14 and 16 may be joined together, for example by welding, as illustrated by optional weld 42, shown in FIG. 2.

FIG. 4 illustrates an elongated blank 44 according to another embodiment of the present invention. Elongated blank 44 comprises a central region 46, two end regions 48 and 50, and two intermediate regions 52 and 54 between the central region 46 and the end regions 48 and 50, respectively. Bores 56, 58 and 60 within the intermediate and central regions are similar to bores 28, 30 and 32, respectively, of elongated blank 10. Relief areas 62 and 64, between the central region 46 and the intermediate regions 52 and 54 facilitate bending of elongated blank 44 at predetermined locations.

Note that end regions 48 and 50 of elongated blank 44 are rounded, in plan view, and have circular bores 66 and 68 to facilitate mounting of a shaft. This indicates the broad range of possible shapes of the resulting bent blank intermediate product and the range of possible finished yoke configurations. End regions 14 and 16 of elongated blank 10 and end regions 48 and 50 of elongated blank 44 may be modified somewhat, e.g., by trimmed end portions 70 and 72 of end regions 14 and 48, as shown, to facilitate overlapping of the end regions.

Having described the invention, what is claimed is:

1. A yoke for a double Cardan universal joint, the yoke comprising:
    an elongated blank with five regions defined along the length of the elongated blank, the defined regions being a central region, two end regions, and an intermediate region located between the central region and each of the two end regions;
    each end region having an end bore having a respective end bore central axis and the central region having a pivot member mount having a pivot member mount central axis; and
    the elongated blank being bent such that the two end regions of the elongated blank overlap with the end bore central axes in substantial alignment to define a shaft mount bore through both end regions, the shaft mount bore having a shaft mount bore central axis substantially co-axial with the pivot member mount central axis such that a pivot member to be mounted on the central region of the elongated blank will be in axial alignment with respect to a shaft to be mounted through the shaft mount bore.

2. A yoke for a double Cardan universal joint according to claim 1, wherein the end bores have corresponding, non-circular configurations with each other when the elongated blank is bent, whereby the shaft mount bore is keyed.

3. A yoke for a double Cardan universal joint according to claim 1, wherein the non-circular bores are hexagonal apertures.

4. A yoke for a double Cardan universal joint according to claim 1, wherein the central region of the elongated blank has a bore defining the pivot member mount.

5. A yoke for a double Cardan universal joint according to claim 1, wherein the elongated blank is bent, predominately, at predetermined locations, such that the yoke has a substantially rectangular longitudinal section, with the central region of the elongated blank being parallel to and opposite the two overlapping end regions and with the two intermediate regions being parallel and opposite each other.

6. A yoke for a double Cardan universal joint according to claim 1, wherein the intermediate regions each have a bore for receiving a universal joint cross-piece, the bores being aligned diametrically opposite each other with respect to the shaft mount bore axis.

7. A yoke for a double Cardan universal joint according to claim 1 wherein the intermediate regions are curved, in cross section, such that at least one concave surface projects radially inwardly, with respect to the shaft mount bore axis.

8. A yoke for a double Cardan universal joint according to claim 7, wherein the intermediate regions approximate longitudinal portions of a cylinder, with concave surfaces facing radially inwardly.

9. A yoke for a double Cardan universal joint according to claim 1, wherein the five regions of the elongated blank have a width, measured crosswise with respect to the elongated blank, and the width of the central region is less than the width of the two end regions.

10. A yoke for a double Cardan universal joint according to claim 9, wherein the width of the intermediate regions is greater than the width of the central region and less than the width of the end regions.

11. A yoke for a double Cardan universal joint according to claim 1, wherein the overlapping end regions are fixed together by welding.

* * * * *